May 7, 1968 H. A. HAMMERSTEIN ET AL 3,381,470
FUEL CONTROL SYSTEM FOR A GAS TURBINE ENGINE
Filed Jan. 17, 1966 3 Sheets-Sheet 1

INVENTORS
HENRY A. HAMMERSTEIN
CHARLES K. McCONNELL
GEORGE W. SHEPHERD
BY Edward A. Casey
ATTORNEY

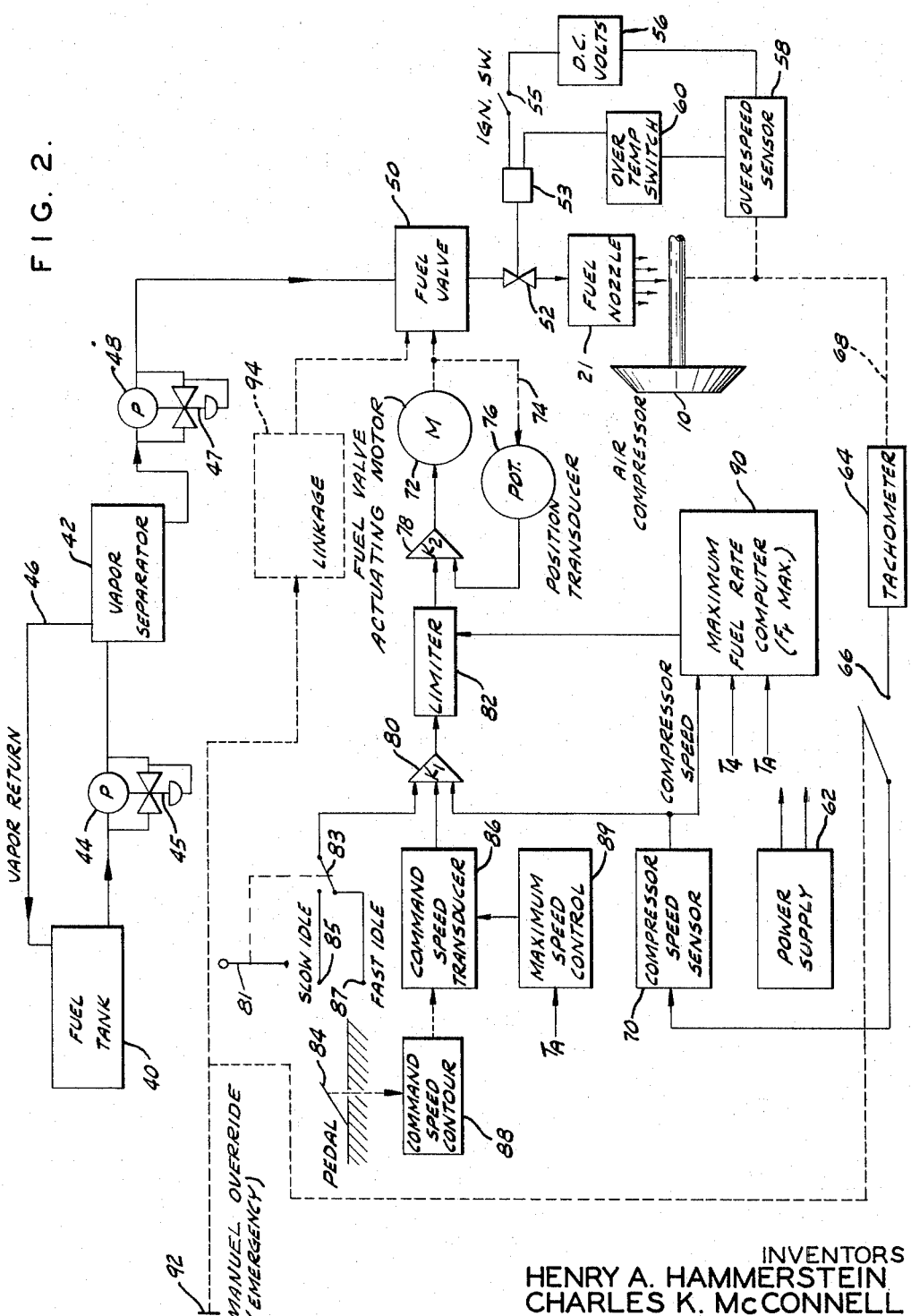

United States Patent Office 3,381,470
Patented May 7, 1968

3,381,470
FUEL CONTROL SYSTEM FOR A GAS
TURBINE ENGINE
Henry A. Hammerstein, Dumont, and George W. Shepherd, Fair Lawn, N.J., and Charles K. McConnell, St. Louis, Mo., assignors to ACF Industries, Incorporated, New York, N.Y., a corporation of New Jersey
Filed Jan. 17, 1966, Ser. No. 521,049
3 Claims. (Cl. 60—39.28)

ABSTRACT OF THE DISCLOSURE

A fuel control system for an automobile gasoline turbine engine having a fuel metering valve which is pressure regulated and adjusted by a servo motor having a feedback loop around the motor and a servo amplifier and another electronic circuit servo loop for the motor extending from the engine to the servo amplifier for comparing engine speed with the position of the accelerator pedal. Manual override control linkage is adapted to open the fuel control valve to a suitable engine speed and disable the servo motor for emergency operation. A valve in series with the fuel control valve is closed when the ignition switch is opened, or when excessive speed or an excessive temperature of the engine occurs.

The invention relates to a fuel control system for a turbine engine, particularly an electronic fuel control system for an automotive gas turbine.

Gas turbine engines have been developed and used for driving passenger automobiles and the like. The proper operation of such turbine engines in automobiles entails rapid fuel control response and precise control of the fuel flow rate in accordance with the characteristic curves of the engine. A fuel control system for automobile turbines must have unusually high reliability and admit of testing and servicing by simple equipment and procedures. It is also desirable that the control system be readily adaptable to variations in performance requirements of production turbines and to turbine design changes.

The electronic fuel control system of the invention provides extremely rapid and sensitive response, which is many times faster than basic engine acceleration and deceleration characteristics. Another advantage of the invention is that it is rugged, reliable and simple. It requires no mechanical linkage from the accelerator pedal to the fuel control system, or from the gear shift lever to the control system for changing idle speeds. The system is amenable to simple methods of trouble shooting and servicing and is easily adjustable to give precise calibration. A very high degree of reliability is attained by using only solid state elements, plastic film potentiometers, platinum temperature sensors and other electronic elements having a very long expected life.

It is the object of the invention to provide a fuel control system having the above-mentioned advantages and others which will become apparent from the following description and the accompanying drawing in which:

FIG. 2 is a diagram of an embodiment of the invention.

Figure 1:
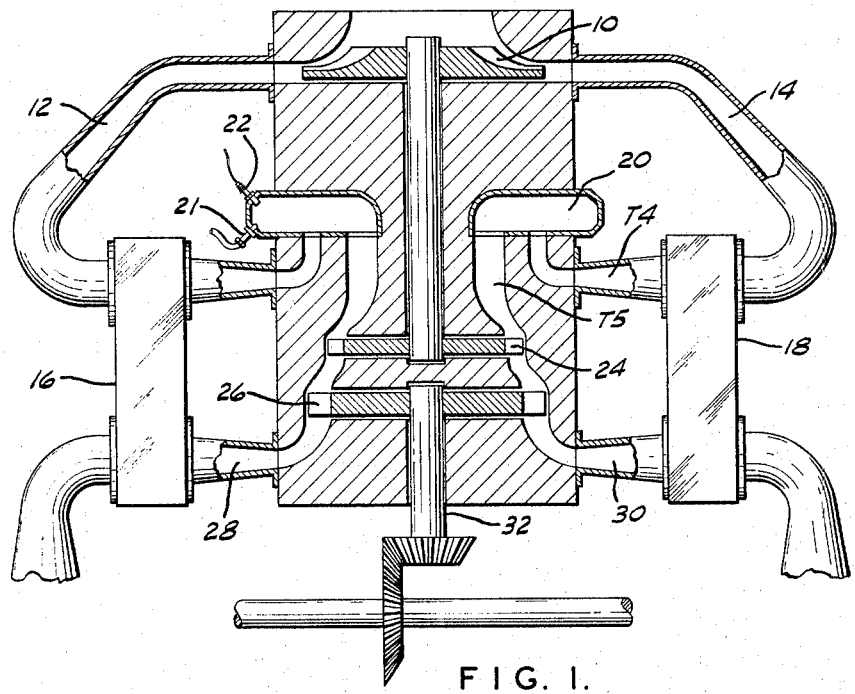
FIG. 1 is a schematic diagram of a gas turbine engine.

The invention will be described for the sake of definiteness as being applied to the particular turbine engine shown in FIG. 1, although the engine itself is no part of the present invention. Air is fed from a suitable intake to a centrifugal air compressor 10, the output of which travels over symmetrical paths 12, 14 to two regenerators 16, 18. The air enters the engine at near-ambient temperature and pressure and is compressed to about 60 p.s.i. and is raised to a temperature of about 400° F. by the compression, and then heated to about 1100° F. by the regenerators. The heated air then enters burner chamber 20, which is equipped with fuel nozzle 21 and igniter 22. In burner chamber 20 the fuel mixture temperature rises to about 1700° F. The hot gases from the burner chamber are fed through the compressor turbine 24 and power turbine 26, and then through regenerators 16, 18 to the exhaust along paths 28 and 30. The regenerators take heat out of the gases in paths 28 and 30 and transfer this heat to the air passing through them in paths 12 and 14. The power turbine shaft 32 is connected to drive the wheels of an automobile.

In the system illustrated in FIG. 2, fuel is pumped from tank 40 to a vapor separator 42 by a high-capacity low-pressure pump 44 capable of handling vapor which may be present with the fuel. The vapor separator has a vapor return line 46 for returning vapor to the fuel tank 40. Fuel is pumped from vapor separator 42 by pump 48 to fuel valve 50 at a high pressure considerably greater than 60 p.s.i. The fuel line is preferably provided with pressure control valves 45 and 47. From valve 50 the fuel passes through a solenoid controlled valve 52 to fuel nozzle 21 of the engine. The solenoid 53 of valve 52 is in a series circuit with ignition switch 55, voltage source 56, compressor overspeed sensor switch 58 and an overtemperature sensor switch 60. Thus, either excessive speed or temperature of the engine, or opening the ignition switch, will open the circuit of solenoid 53 and cause valve 52 to shut off the supply of fuel. Overtemperature sensor 60 responds to an excessive temperature condition of the compressor, which may be temperature T5 at the output of the burner chamber.

Power supply 62 provides regulated DC power for the control circuit. An electrical tachometer is driven by the compressor turbine 24 through linkage 68, which includes a step-down gearing, not shown. The output voltage of tachometer 64 is supplied to compressor speed detector or sensor 70, which yields a DC voltage representing compressor speed.

Fuel valve 50 is controlled by a servo motor circuit comprising a DC torque motor actuator 72. The position of fuel valve 50 is fed by linkage 74 to position transducer 76, which is a suitable potentiometer connected to a DC source of voltage and supplies a signal representing the fuel flow rate to amplifier 78. This amplifier drives motor 72 and the other input of the amplifier is obtained from a high-gain speed-error sensing operational amplifier 80 through a limiter 82. The closed servo loop around motor 72 helps to insure that the signal entering amplifier 78 accurately represents a command fuel flow rate. Amplifier 78 provides an output to drive actuator 72 determined by the difference between the speed-error signal from amplifier 80 and the signal from position tansducer 76. The input of amplifier 80 is connected to switch 83 for switching from a low voltage "Slow Idle" terminal 85 to a high voltage "Fast Idle" terminal 87. Idle switch 83 is controlled by the transmission selector lever 81. It can be seen from FIG. 2 that the speed control loop includes the command speed transducer 86 actuated by the accelerator pedal 84, the speed sensor 70, the speed-error sensing amplifier 80, the actuator amplifier 78, fuel valve 50, the compressor shaft and tachometer 64. At any position of the accelerator pedal the speed-error sensing amplifier 80 provides an output into the actuator amplifier 78 until the input signal is balanced out by the developed speed signal from speed sensor 70. At this point the system nulls to the nominal amount necessary to maintain this steady-state speed. Since the gain of the speed-error sensing amplifier 80 is high, small changes between the command speed and the speed sensor signals tend to greatly increase or decrease the fuel valve opening, giving the sensitive response desired in the system.

Accelerator pedal 84 is linked to command speed transducer 86, preferably through a command speed contour motion converting mechanism 88, for converting the movement of the accelerator pedal to a movement suitable for operating the potentiometer constituting command speed transducer 86. The maximum electrical output of transducer 86 is limited by a maximum speed control circuit 89 consisting of a thermistor and resistor network which governs the maximum compressor speed required to provide constant power output at the various ambient temperatures $T_A$ which are encountered. The output of transducer 86 is the command speed signal delivered to amplifier 80.

The operation of the speed control loop as so far described is as follows. A signal generated in the accelerator command speed transducer 86 by depressing the accelerator pedal 84 results in an output from the error sensing amplifier 80, providing a hard open signal into the differential amplifier 78. The actuator 72 then operates the fuel valve 50 to increase fuel flow to the engine. As the engine accelerates, the frequency of tachometer generator 64 increases, changing the output from the compressor speed detector 70, eventually balancing out the signal from accelerator speed transducer 86. At this point the error signal is reduced to a steady state value which in turn causes fuel valve 50 to be set to its new steady state flow condition.

The remaining portion of the system is the maximum fuel rate computer 90. The required input signals for the computer are those representing the T4 temperature, ambient temperature $T_A$, and compressor speed. The computer provides a signal voltage proportional to the maximum allowable fuel flow for the particular input conditions. This signal voltage is used to control limiter 82 to provide a limit on the signal into the differential amplifier 78. The system will limit the hard open signal from the error amplifier 80 at any time to the maximum fuel rate allowable under the particular existing engine conditions. The circuitry of computer 90 will be described in connection with FIG. 5.

An emergency mechanical fuel valve control system is provided in case of a failure of the electronic control system. The emergency manual override includes a manual control member or knob 92 connected through suitable linkage 94 to the fuel valve 50 to set it to admit a constant amount of fuel to the engine, to permit some maximum travel speed such as 30 miles per hour. Control member 92 also opens switch 66 to de-energize the fuel control system and thus render it inoperative. Variations from this speed may be accomplished by a separate system (not shown herein) for changing the position of a set of nozzle blades placed between the compressor turbine and the power turbine, preferably in response to operation of the accelerator pedal. Nozzle regulators of this type are known in the art and are not a part of this invention. A turbine engine having such a nozzle regulator is disclosed in Patent 3,168,810 to J. B. Gatzemeyer et al.

Figure 3:
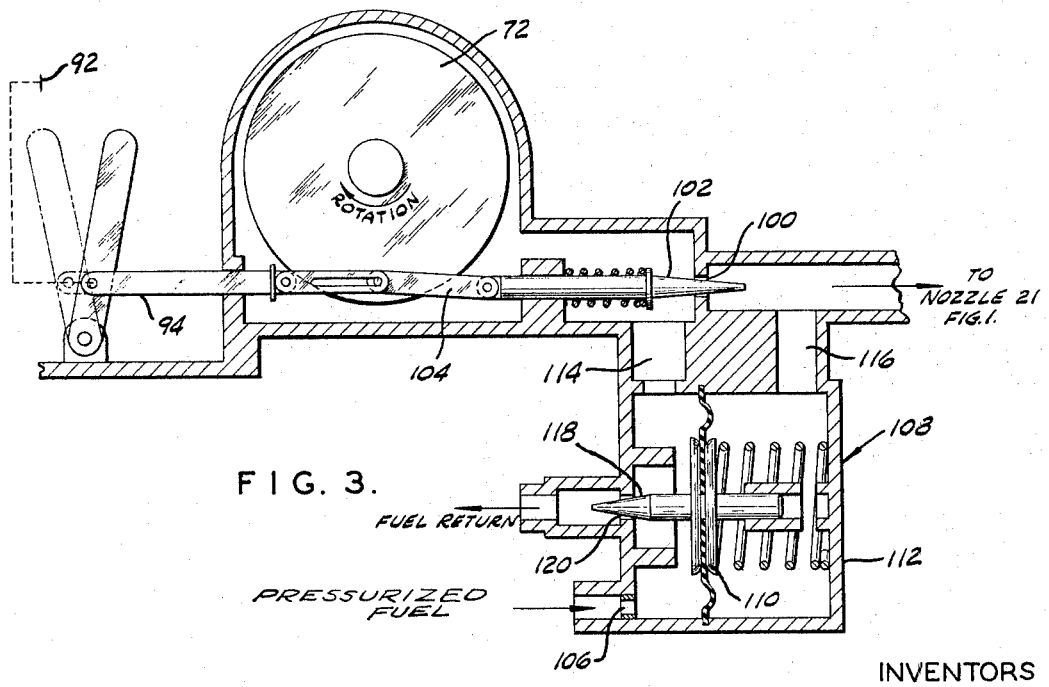
FIG. 3 is a partial view of the fuel control valve and its actuating mechanism.

FIG. 3 schematically illustrates the fuel control valve 50 and its associated equipment. The valve orifice 100 is controlled by a spring-pressed metering pin 102, which is connected by linkage 104 to the rotor of motor actuator 72, and also by lost-motion linkage 94 to the emergency control member 92, which are illustrated only schematically in FIG. 3. Fuel from pump 48 enters orifice 106. The valve includes a pressure regulator 108 for maintaining a given pressure drop across metering orifice 100 for all values of fuel flow so that fuel flow rate will be a function only of the metering pin position. The pressure regulator 108 includes a spring pressed diaphragm 110 which divided housing 112 into two chambers, which communicate through passages 114 and 116 with the input and output sides of metering orifice 100. When the pressure across orifice 100 increases, diaphragm moves to the right and metering pin 118 fixed to the diaphragm increases the opening of regulating orifice 120, thereby permitting more fuel to be returned to the fuel tank 40 or vapor separator 42 and a consequent drop of pressure on the left side of diaphragm 110. If the pressure drop across orifice 100 decreases, diaphragm 110 moves to the left and causes the pressure at the inlet of orifice 100 to rise. The rate of fuel flow will thus tend to be a function of the position of the metering pin, which is determined by the current supplied to the rotary torque motor 72.

While metering pins 102 and 118 are shown with a simple taper, it will be recognized that these pins may be provided with any shape or contour required or found necessary to control fuel flow in response to engine requirements for any operating condition. Similarly jets 100 and 120 may be of some configuration other than the simple cylindrical form illustrated.

Computer 90 is required to produce a voltage corresponding to the maximum allowable fuel flow as a function of the compressor speed, the ambient temperature $T_A$ and the T4 (or T5) temperature. The desired fuel flow under various conditions is determined by measurements of the turbine engine operating characteristics under various conditions. A set of such characteristic curves, for an engine of the type shown in FIG. 1, is presented in FIG. 4. Curves 121, 122, and 123 show the fuel flow required for accelerating the engine when it is cold, when it is hot, and when it is at an intermediate typical temperature. Curve 124 shows the fuel flow requirement at various constant speeds. Dashed line 125 shows an idealized fuel rate variation to decelerate from point 126 to point 127, and lines 128 show an idealized fuel flow variation for accelerating from point 127 to point 129.

Figure 4:
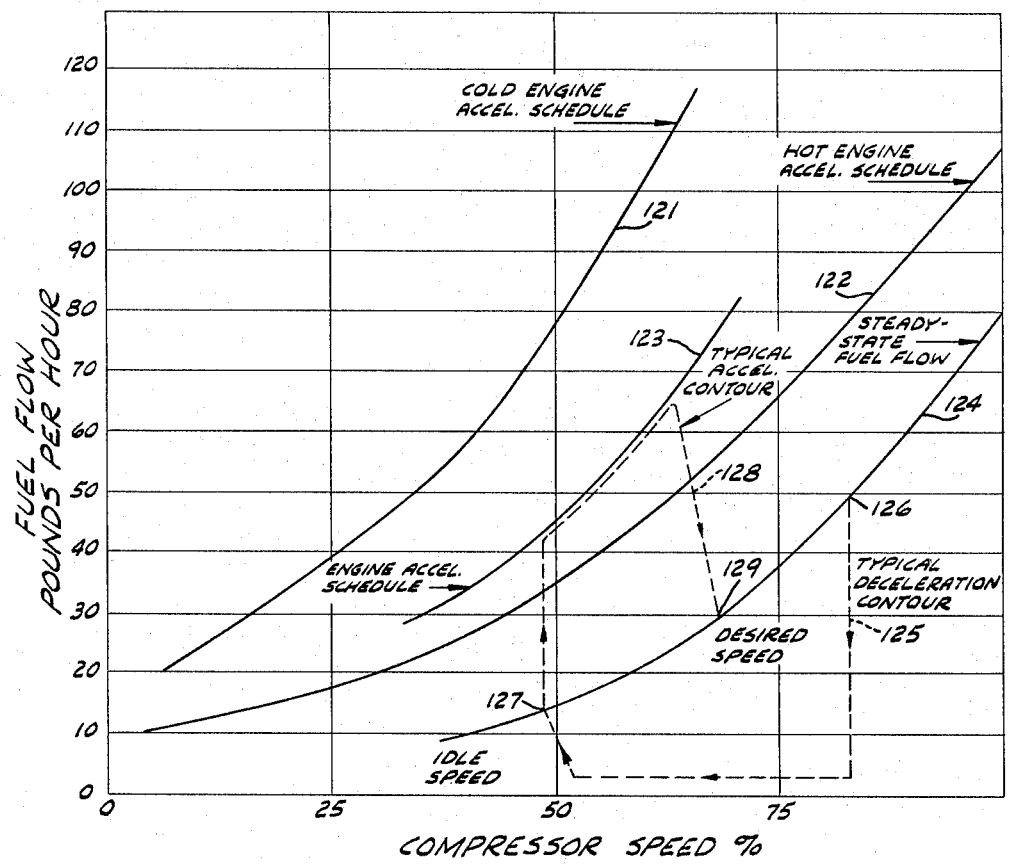
FIG. 4 is a set of graphs of the operating characteristics of the engine.
Figure 5:
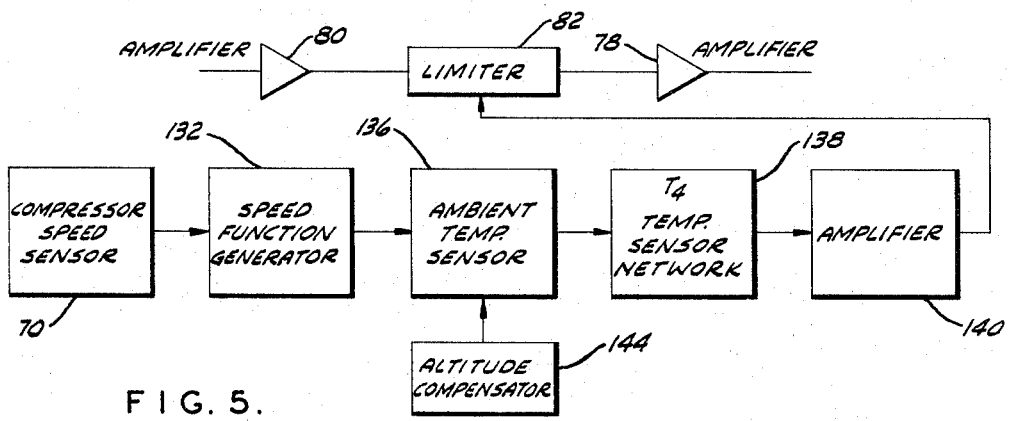
FIG. 5 is a diagram of the maximum fuel rate computer.

The maximum fuel rate, determined by the fuel control calibration curves of FIG. 4, can be expressed at any time as a function of compressor speed times a function of ambient temperature times a function of T4 temperature. This is the actual expression which is mechanized within the computer 90. Referring to FIG. 5, the function of compressor speed is generated by the speed function generator 132, consisting of a network of diodes and resistors which generates a curve approximating the shape of the cold engine acceleration schedule 121 of FIGURE 4. This curve is in terms of a voltage derived from the compressor speed sensor 70. This voltage is then multiplied by the ambient temperature sensing network and amplifier 136, which provides an output over input relationship as a function of ambient temperature as sensed by a thermistor network included in circuit 136. The product of speed function and ambient temperature function is multiplied by a T4 sensing network and amplifier 138. The output over input relationship of circuit 138 is a function of the T4 temperature as sensed by a platinum resistor or other suitable sensor. The output amplifier 140 serves as an isolation amplifier. The output voltage from amplifier 140 then represents the maximum fuel rate quantity for the instantaneous engine and ambient conditions. In addition altitude correction or compensation is provided by pressure or altitude sensor 144 which may include a bellows activating a potentiometer connected to vary the output of the ambient sensing network 136 of the maximum fuel rate computer.

The limiter 82, mentioned previously consists simply of a series resistor and a shunt diode connected to the output of amplifier 140. The shunt diode prevents the error voltage supplied by operational amplifier 80 from exceeding the maximum computed voltage (supplied thereto by amplifier 140) by its forward conductive characteristics. The series resistor simply limits the current from the operational amplifier 80 to a reasonable value.

The operation of the invention will be understood from the foregoing description, and may be briefly summarized as follows. Before the ignition is turned on and the turbine is at rest, fuel valve 50 is set for minimum flow and solenoid valve 52 is closed. When the ignition is turned on and cranking is started, solenoid valve 52 opens when the tachometer 64 reaches about half of its normal output voltage. As soon as the engine starts the speed is regulated to "Slow Idle." At any engine speed, valve 50 is positioned at the steady state fuel flow condition by the speed control circuitry connected to actuator 72. Depressing the accelerator 84 causes the valve 50 to provide the computed maximum fuel flow as determined by the particular speed and temperature conditions existing at that time. As these conditions change the computer 90 limits the maximum fuel flow accordingly. Reduction of the accelerator pedal signal below the engine r.p.m. causes the valve 50 to reduce the fuel flow to the engine to a keep-alive amount. When the engine has slowed to the new command speed the valve increases fuel flow to maintain the desired speed, as indicated by curve 125 of FIG. 4. With the accelerator pedal 84 fully depressed for maximum speed, the signal from the transducer 86 is limited to a maximum command speed as determined by the ambient temperature T4 (or T5) and engine r.p.m. Overspeed and overheating are prevented by the circuit connected to solenoid 53 of valve 52.

The embodiment of the invention described and illustrated herein is particularly applicable to an automobile turbine engine, but it will be apparent to those skilled in the art that it may be modified or adapted for other vehicle engines without departing from the principles of the invention as defined in the claims.

What is claimed is:

1. A fuel control system for an automobile gas turbine engine having an air compressor, a turbine for driving said air compressor, and a power turbine for driving the automobile, comprising a fuel metering valve connected to the engine, a motor connected to operate said valve, a servo circuit connected to said motor and including a motor position feedback connection, means for generating a speed controlling electrical signal, means for modifying said signal in accordance with the ambient temperature of air entering said air compressor, means for generating a feedback signal representing the speed of the air compressor, means for producing a speed-error signal in response to said feedback signal and speed controlling signal, means for impressing the speed-error signal on said servo circuit for causing the servo circuit to drive the motor and thereby adjust the fuel metering valve, and manually operated means for disabling operation of said valve by the motor and for opening said valve independently of the motor for emergency operation of the engine.

2. A system according to claim 1, comprising a second valve in series with the fuel metering valve, means for operating the second valve and a control circuit connected to said means including an automobile ignition switch, an engine overspeed sensor switch and a source of voltage for shutting off said second valve when the engine speed becomes excessive or the ignition switch is open.

3. A system according to claim 2 wherein said control circuit includes an engine over-temperature switch for shutting off said second valve in response to excessive engine temperature.

References Cited

UNITED STATES PATENTS

| | | | |
|---|---|---|---|
| 2,648,194 | 8/1953 | Jorgensen et al. | 60—39.28 |
| 2,764,867 | 10/1956 | Farkas | 60—39.28 |
| 2,786,330 | 3/1957 | Brandau | 60—39.28 |
| 2,796,136 | 6/1957 | Mock | 60—39.28 X |
| 2,805,546 | 9/1957 | Lawry et al. | 60—39.28 |
| 2,851,855 | 9/1958 | Gamble | 60—39.28 |

JULIUS E. WEST, *Primary Examiner.*